United States Patent
Vivanco et al.

(10) Patent No.: US 11,991,645 B2
(45) Date of Patent: May 21, 2024

(54) DETERMINING A RESPONSE BY USER EQUIPMENT TO A BASE STATION SIGNAL BASED ON TRANSMISSION SIGNAL STRENGTH RELAYED WITH THE SIGNAL

(71) Applicants: AT&T INTELLECTUAL PROPERTY I, L.P., Atlanta, GA (US); AT&T TECHNICAL SERVICES COMPANY, INC., Vienna, VA (US)

(72) Inventors: Daniel Vivanco, Ashburn, VA (US); David Ross Beppler, Duluth, GA (US); Slawomir Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 176 days.

(21) Appl. No.: 17/824,883

(22) Filed: May 25, 2022

(65) Prior Publication Data
US 2023/0388938 A1    Nov. 30, 2023

(51) Int. Cl.
*H04W 76/10* (2018.01)
*H04W 52/24* (2009.01)

(52) U.S. Cl.
CPC ......... *H04W 52/245* (2013.01); *H04W 76/10* (2018.02)

(58) Field of Classification Search
None
See application file for complete search history.

(56) References Cited

U.S. PATENT DOCUMENTS

| | | | | |
|---|---|---|---|---|
| 7,516,153 | B2 * | 4/2009 | Hackworth | G06F 8/35 707/999.102 |
| 7,812,766 | B2 * | 10/2010 | Leblanc | G01S 1/026 701/408 |
| 8,135,413 | B2 * | 3/2012 | Dupray | H04W 4/02 455/456.1 |
| 8,886,197 | B2 * | 11/2014 | Lindoff | H04W 36/0088 455/437 |
| 8,994,591 | B2 * | 3/2015 | Dupray | H04W 64/00 342/465 |
| 9,237,493 | B2 * | 1/2016 | Kanamarlapudi | H04W 36/36 |
| 9,256,506 | B1 * | 2/2016 | Taylor | G06F 11/3006 |
| 9,479,807 | B1 * | 10/2016 | Bugajski | H04N 21/6582 |
| 10,667,097 | B2 * | 5/2020 | Kahtava | H04W 4/40 |
| 11,523,452 | B1 * | 12/2022 | Marupaduga | H04W 76/15 |

(Continued)

*Primary Examiner* — Hai V Nguyen

(57) ABSTRACT

The technologies described herein are generally directed to determining a response by a user equipment to a signal from a base station based on transmission signal strength relayed with the signal in a fifth generation (5G) network or other next generation networks. For example, a method described herein can include receiving initial signal from base station equipment, with the initial signal encoding a signal strength of the base station transmission, which can facilitate establishing a connection between the user equipment and the base station equipment. The method can further include, based on the signal strength value, estimating a likelihood that a response signal from the user equipment would be able to reach base station equipment. Further, the method can include, based on the estimated likelihood, determine a response to initial signal.

20 Claims, 10 Drawing Sheets

(56) References Cited

U.S. PATENT DOCUMENTS

| | | | | |
|---|---|---|---|---|
| 11,611,892 B1* | 3/2023 | Pawar | H04W 24/08 | |
| 11,638,199 B1* | 4/2023 | Marupaduga | H04W 76/15 | 370/329 |
| 11,758,600 B1* | 9/2023 | Marupaduga | H04W 76/15 | 370/230 |
| 2007/0287473 A1* | 12/2007 | Dupray | H04W 4/029 | 455/456.1 |
| 2011/0244887 A1* | 10/2011 | Dupray | H04W 4/027 | 455/456.2 |
| 2012/0300739 A1* | 11/2012 | Froberg | H04L 1/0021 | 370/329 |
| 2013/0053025 A1* | 2/2013 | Lindoff | H04W 36/0088 | 455/437 |
| 2014/0133465 A1* | 5/2014 | Johansson | H04W 76/18 | 370/332 |
| 2014/0349653 A1* | 11/2014 | Kanamarlapudi | H04W 36/36 | 455/437 |
| 2017/0019222 A1* | 1/2017 | Ge | H04L 25/03229 | |
| 2017/0055130 A1* | 2/2017 | LeBlanc | G01S 5/0009 | |
| 2018/0295481 A1* | 10/2018 | Kahtava | H04W 4/70 | |
| 2020/0028768 A1* | 1/2020 | Sadiq | H04W 56/0005 | |
| 2020/0067341 A1* | 2/2020 | Glover | H02J 50/80 | |
| 2020/0400838 A1* | 12/2020 | Agee | G01S 19/215 | |
| 2021/0045093 A1* | 2/2021 | Rao | H04W 72/04 | |
| 2021/0360432 A1* | 11/2021 | Mo | H04B 7/0617 | |
| 2022/0053020 A1* | 2/2022 | Buyukcorak | H04W 12/122 | |
| 2022/0061014 A1* | 2/2022 | Sundararajan | H04W 64/006 | |
| 2022/0146620 A1* | 5/2022 | Alawieh | G01S 5/10 | |
| 2022/0159490 A1* | 5/2022 | Ahmed | H04W 72/542 | |
| 2022/0167241 A1* | 5/2022 | Kenington | H04W 48/04 | |
| 2022/0334215 A1* | 10/2022 | Thompson | G06F 18/2415 | |
| 2023/0006748 A1* | 1/2023 | Ryu | H04B 17/318 | |
| 2023/0035330 A1* | 2/2023 | Notargiacomo | H04B 7/0842 | |
| 2023/0042545 A1* | 2/2023 | Palaios | H04W 28/0268 | |
| 2023/0131370 A1* | 4/2023 | Gorski | A01K 29/005 | 340/573.1 |
| 2023/0273287 A1* | 8/2023 | Wigren | G01S 5/0294 | 342/451 |
| 2023/0327790 A1* | 10/2023 | Da Silva | H04W 24/10 | 455/67.11 |
| 2023/0333241 A1* | 10/2023 | Zhang | G01S 13/876 | |

* cited by examiner

400

SYSTEM INFORMATION BLOCK TYPE #1 (SIB1) 450

| ServingCellConfigCommonSIB | |
|---|---|
| downlinkConfigCommon | DownlinkConfigCommonSIB |
| uplinkConfigCommon | UplinkConfigCommonSIB |
| supplementaryUplink | UplinkConfigCommonSIB |
| n-TimingAdvanceOffset | ENUMERATED {n0, n25600, n39936} |
| ssb-PositionsInBurst | inOneGroup    BIT STRING (SIZE (8)) |
|  | groupPresence    BIT STRING (SIZE (8)) |
| ssb-PeriodicityServingCell | ENUMERATED {ms5, ms10, ms20, ms40, ms80, ms160} |
| tdd-UL-DL-ConfigurationCommon | TDD-UL-DL-ConfigCommon |
| ss-PBCH-BlockPower | INTEGER (-60 .. 50) |

420

ADDITIONAL INFORMATION 430

FIG. 4

DETERMINING A RESPONSE BY USER EQUIPMENT TO A BASE STATION SIGNAL BASED ON TRANSMISSION SIGNAL STRENGTH RELAYED WITH THE SIGNAL

TECHNICAL FIELD

The subject application is related to different approaches to handling communication in networked computer systems and, for example, to providing an indication of transmission power with base station synchronization signals.

BACKGROUND

As network implementations have continued to increase in size and diversity, approaches to establishing connections to user equipment have increased in complexity. In some contemporary implementations, uplink and downlink communications between base station equipment and user equipment can vary in transmission power for different reasons.

Problems can occur because of the differences in transmission capabilities between powerful base station equipment and user equipment with more limited transmission resources. These problems continue to worsen because in modern communications approaches, some power settings of base station equipment that have been selected to enhance communication with some user equipment can also cause problems with the operation of other user equipment.

BRIEF DESCRIPTION OF THE DRAWINGS

The technology described herein is illustrated by way of example and not limited in the accompanying figures in which like reference numerals indicate similar elements and in which:

FIG. 4 depicts an example SIB1 message that includes an additional field with transmission power information, in accordance with one or more embodiments.

DETAILED DESCRIPTION

Figure 1:
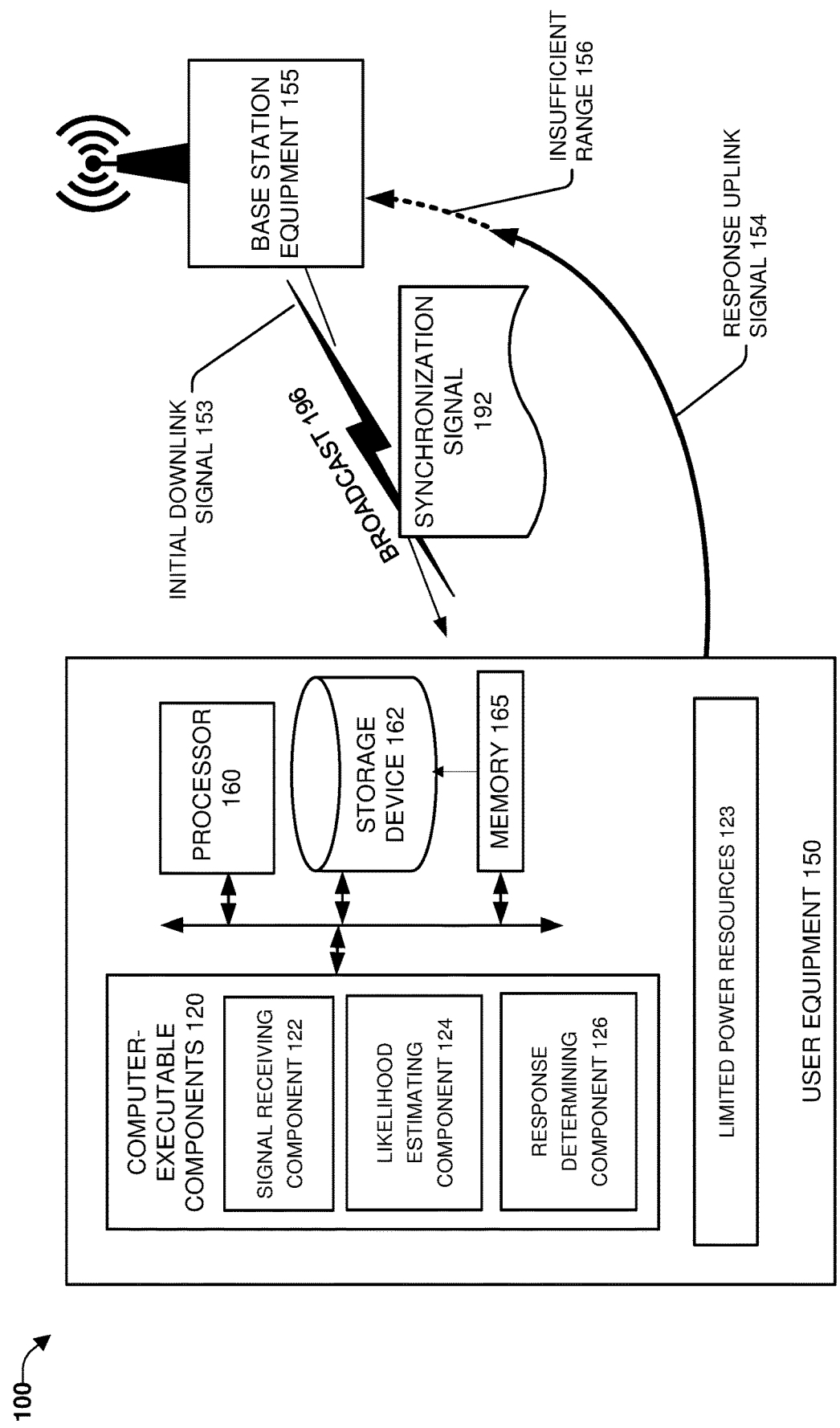
FIG. 1 is an architecture diagram of an example system that can facilitate determining a response by a user equipment to a signal from a base station based on transmission signal strength relayed with the signal, in accordance with one or more embodiments.

Generally speaking, one or more embodiments of a system described herein can facilitate determining a response by a user equipment to a signal from a base station based on transmission signal strength relayed with the signal. In addition, one or more embodiments described herein can be directed towards a multi-connectivity framework that supports the operation of new radio (NR, sometimes referred to as 5G).

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments, understandable variations of the non-limiting terms "signal propagation source equipment" or simply "propagation equipment," "radio network node" or simply "network node," "radio network device," "network device," and access elements are used herein. These terms may be used interchangeably and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNode B (gNB), eNode B (eNB), network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, understandable variations of the non-limiting term user equipment (UE) are used. This term can refer to any type of wireless device that can communicate with a radio network node in a cellular or mobile communication system. Examples of UEs include, but are not limited to, a target device, device to device (MESSAGE TRANSMITTING COMPONENTD) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE. Some embodiments are described in particular for 5G new radio systems. The embodiments are however applicable to any radio access technology (RAT) or multi-RAT system where the UEs operate using multiple carriers, e.g., LTE.

One having skill in the relevant art(s), given the disclosure herein understands that the computer processing systems, computer-implemented methods, equipment (apparatus) and/or computer program products described herein employ hardware and/or software to solve problems that are highly technical in nature (e.g., analyzing signal strength values and predicting signal propagation of user equipment), that are not abstract and cannot be performed as a set of mental acts by a human. For example, a human, or even a plurality of humans, cannot efficiently determine a beneficial response to a base station synchronization signal (which generally cannot be performed manually by a human) with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate determining a response by a user equipment to a signal from a base station based on transmission signal strength relayed with the signal. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate determining a response by a user equipment to a signal from a base station based on transmission signal strength relayed with the signal, in accordance with one or more embodiments. For purposes of brevity, description of like elements and/or processes employed in other embodiments is omitted. As depicted, system 100 includes user equipment 150 receiving synchronization signal 192 that was broadcast 196 by base station equipment 155. In some examples described herein, user equipment can receive initial downlink signal 153 and predict whether a response uplink signal 154 would be successfully received by base station equipment 155 or whether the transmission capabilities of user equipment would result in a signal with insufficient range 156 to reach base station equipment 155.

Base user equipment 150 includes computer executable components 120, limited power resources 123 (e.g., a battery) processor 160, storage device 162, and memory 165. Computer executable components 120 can include signal receiving component 122, likelihood estimating component 124, response determining component 126, and other components described or suggested by different embodiments described herein, that can improve the operation of system 100.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, user equipment 150 can further comprise various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining signal receiving component 122. As discussed with FIGS. 2-3 below, signal receiving component 122 can, in accordance with one or more embodiments, facilitate receiving a signal from base station equipment, with the initial signal being encoded in a message within an attachment message that can facilitate establishing a connection between the user equipment and the base station equipment. For example, one or more embodiments can facilitate receiving initial downlink signal 153 from base station equipment 155, with initial downlink signal 153 encoding synchronization signal 192 that includes extra information to facilitate establishing a connection between user equipment 150 and base station equipment 155. In some circumstances, user equipment 150 can receive the synchronization signal from eNode B signal source equipment. In one or more embodiments, the attachment message can comprise a broadcast system information message.

Further, in another example, in one or more embodiments, computer executable components 120 can include instructions that, when executed by processor 160, can facilitate performance of operations defining likelihood estimating component 124. As discussed with FIGS. 2-4 below, likelihood estimating component 124 can, in accordance with one or more embodiments, based on a signal strength value in an attachment message, estimate a likelihood that a response signal from user equipment would be able to reach the base station equipment in a condition defined with respect to a threshold value, with the signal strength value corresponding to a transmission signal strength employed by the base station equipment to communicate the initial signal. For example, in different implementations, one or more embodiments can, based on a transmission signal strength value in synchronization signal 192, estimate a likelihood that response uplink signal 154 from user equipment 150 would be able to reach base station equipment 155 in a condition (e.g., with a signal quality) defined with respect to a threshold value, with the signal strength value corresponding to a transmission signal strength employed by base station equipment 155 to communicate initial downlink signal 153.

In another example implementation, the threshold value can correspond to a level of performance an uplink transmission of response uplink signal 154 to base station equipment 155 from user equipment 150. In an example approach to predicting the success of response uplink signal 154, user equipment 150 can estimate the likelihood by determining a transmission distance between user equipment 150 and base station equipment 155. In embodiments, this transmission distance can be based on a geographic location of base station equipment 155 determined by user equipment 150 based on base station information included in attachment message 152. In some implementations, the base station information can be a cell identifier corresponding to the base station equipment, which can be used to look up the geographic location of base station equipment 155 either from information stored on user equipment 150 or retrieved from core network equipment.

In yet another example, computer executable components 120 can include instructions that, when executed by processor 160, can facilitate performance of operations defining response determining component 126. As discussed herein, in one or more embodiments, response determining component 126 can, based on the estimated likelihood, determine a response to the initial signal. For example, one or more embodiments can, based on the estimated likelihood, determine a response to initial downlink signal 153.

In an example implementation, when the estimated likelihood determined by likelihood estimating component 124 is determined to be above or equal to a selected likelihood value, the response determined by response determining component 126 can be communicating response uplink signal 154 to base station equipment 155 to facilitate establishing a connection. Alternatively, when the estimated likelihood determined by likelihood estimating component 124 is not determined to be above or equal to the selected likelihood value, the response determined by response determining component 126 can be to not communicate response uplink signal 154 to base station equipment 155, e.g., beneficially conserving limited power resources 123.

Figure 2:
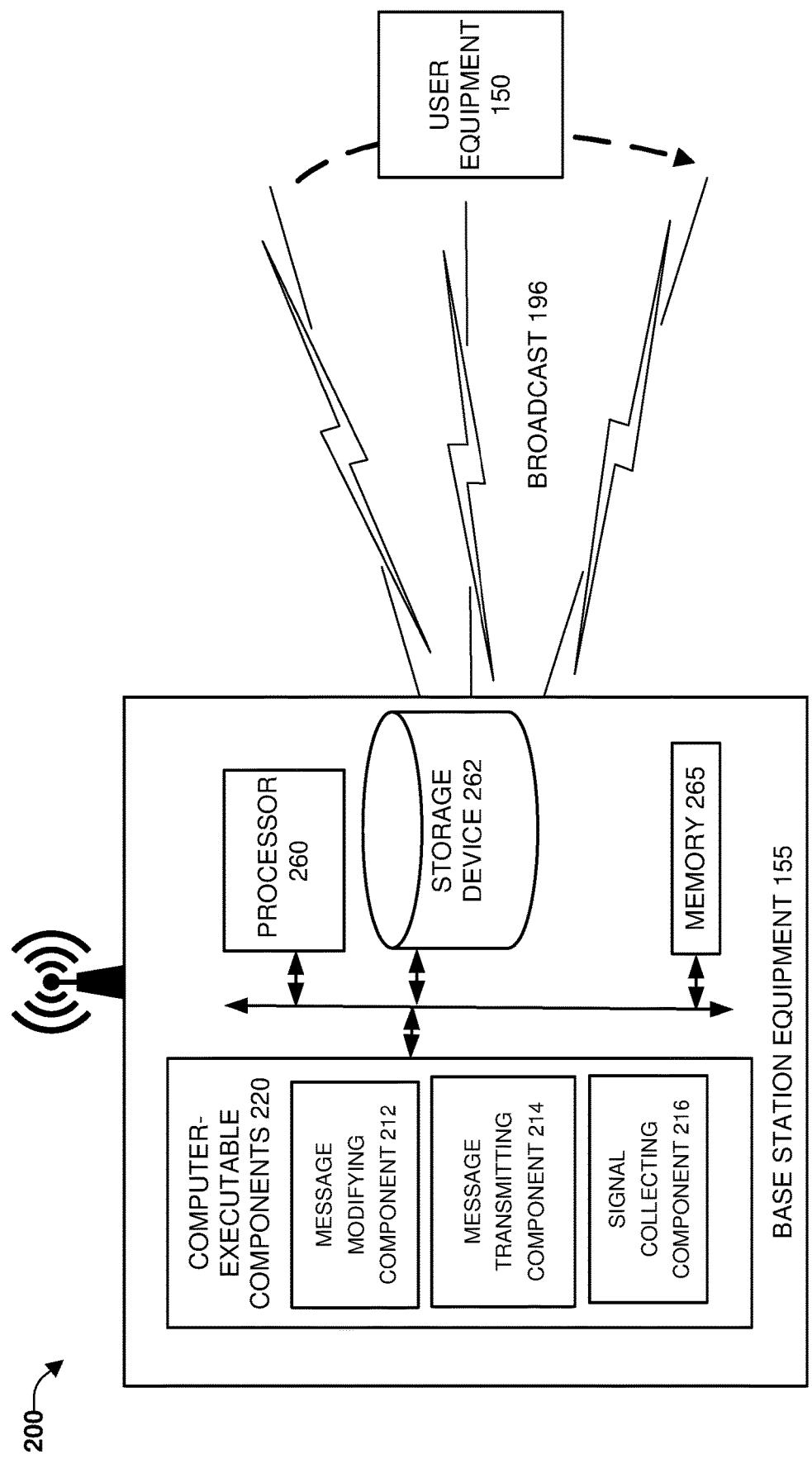
FIG. 2 is a diagram of a non-limiting example system that can facilitate broadcasting a connection reference signal to a geographic area, with the connection reference signal including the signal strength of the broadcast and an identifier of the base station equipment, in accordance with one or more embodiments.

FIG. 2 is a diagram of a non-limiting example system 200 that can facilitate broadcasting a connection reference signal to a geographic area, with the connection reference signal including the signal strength of the broadcast and an identifier of the base station equipment, in accordance with one or more embodiments. For purposes of brevity, description of like elements and/or processes employed in other embodiments is omitted.

As depicted, system 200 can include base station equipment 155 broadcasting 196 a signal that is received by user equipment 150. In one or more embodiments, base station equipment 155 can include memory 265 that can store one or more computer and/or machine readable, writable, and/or executable components and/or instructions 220 that, when respectively executed by processor 260, can facilitate performance of operations defined by the executable component(s) and/or instruction(s).

In system 200, computer executable components 220 can include message modifying component 212, message transmitting component 214, signal collecting component 216, and other components described or suggested by different embodiments described herein that can improve the operation of system 200. For example, in some embodiments, base station equipment 155 can further comprise various computer and/or computing-based elements described herein with reference to mobile handset 900 of FIG. 9 and operating environment 1000 described with FIG. 10.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining message modifying component 212. As discussed with FIGS. 4-5 below, in one or more embodiments, message modifying component 212 can modify a connection reference signal (e.g., synchronization signal or system information block type #1 (SIB 1)) to include additional, beneficial information, e.g., the transmission power selected for the broadcast 196. It is understood by one having skill in the relevant art(s), given the description herein, that including transmission power in other types of signals that currently perform or will perform UE 150 attachment functions in future systems, can also provide benefits described herein, e.g., conserving UE 150 limited power resources 123 by reducing the likelihood of attachment failures.

In another example, in one or more embodiments, computer executable components 220 can include instructions that, when executed by processor 260, can facilitate performance of operations defining message transmitting component 214. As discussed with FIGS. 4-5 below, message transmitting component 214 can, in accordance with one or more embodiments, broadcast a connection reference signal to a geographic area, with the connection reference signal including the signal strength of the broadcast and an identifier of the base station equipment, e.g., base station equipment 155 broadcasting 196 synchronization signal 192 towards a geographic area where the signal is received by user equipment 150.

In another example, in one or more embodiments, computer executable components 220 can include instructions that, when executed by processor 260, can facilitate performance of operations defining signal collecting component 216. As discussed with FIGS. 3-5 below, signal collecting component 216 can, in accordance with one or more embodiments, receive a connection response signal from user equipment 150 from the geographic area. As described with FIG. 1 above, the connection response signal can be response uplink signal 154 that was generated by user equipment 150 based on a determination that a likelihood that the connection response signal would be received by base station equipment 155 with a threshold level of signal quality.

Figure 3:
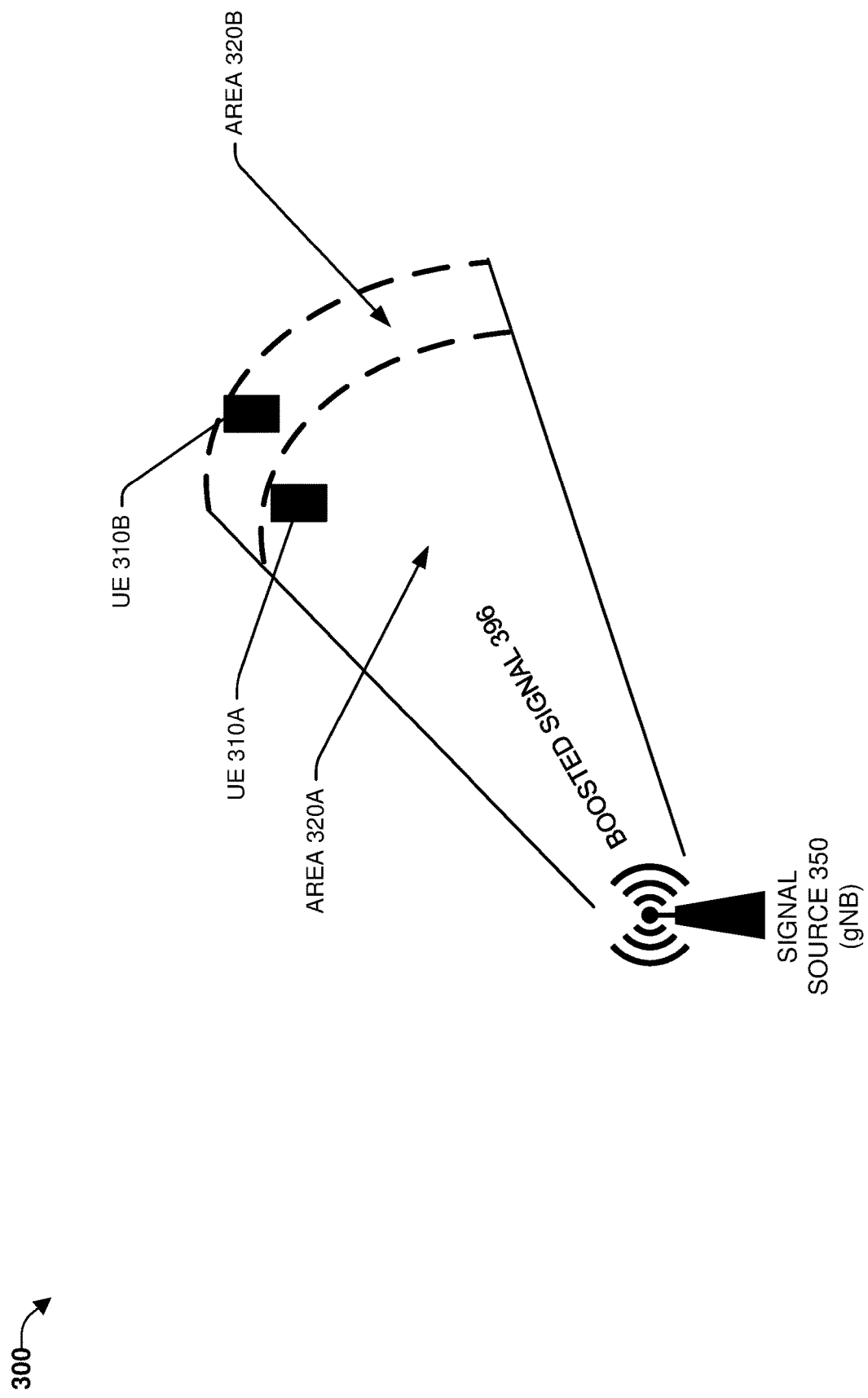
FIG. 3 is a diagram of a non-limiting example system that can facilitate avoiding responses by user equipment to attachment signals from base station equipment located outside of the transmission range of the user equipment at a selected power level, in accordance with one or more embodiments described herein.

FIG. 3 is a diagram of a non-limiting example system 300 that can facilitate avoiding responses by user equipment to attachment signals from base station equipment located outside of the transmission range of the user equipment at a selected power level, in accordance with one or more embodiments described herein. For purposes of brevity, description of like elements and/or processes employed in other embodiments is omitted. FIG. 3 depicts signal source 305 with boosted signal 396 broadcast to areas 320A-B to be received by UEs 310A-B located in areas 320A-B respectively.

In an example operation of signal source 350, to improve the downlink coverage of signal source 350, based on different circumstances, signal source 350 can implement a signal synchronization block (SSB) power boost. For example, boosted signal 396 is received by UE 310A in area 320A, and the boosting can improve the speed and quality of a connection established between signal source 350 and UE 310A based on boosted signal 396 as compared to a non-boosted signal in similar circumstances.

Thus, in this example, an SSB power boost can beneficially increase downlink coverage for area 320A, however as depicted, boosted signal 396 can also be received by UE 310B in area 320B where UE 310B cannot (at a selected transmission strength based on different factors) transmit a response signal that reaches signal source 350, e.g., a downlink/uplink (also termed a 'coverage footprint') mismatch has been created for UE 310B in area 320B, that is, UE 310B can detect the new radio (NR) physical cell identifier (PCI) signal from an gNB (signal source 350), but the gNB cannot 'hear' (e.g., receive a response signal from) UE 310B. It should be noted that the 'boosting' of the signal broadcast by signal source 350 is mentioned in some examples herein because this is one circumstance where DL/UL mismatches can occur, but these examples area non-limiting, and similar mismatches can occur with non-boosted signals.

Continuing this example, in area 320B, UE 310B will be able to detect the gNB PCI of gNB 350, but because gNB 350 cannot hear UE 310B, a session cannot be setup/ maintained, and UE 310B may detrimentally try to connect/ handover to gNB 350 multiple times, which can yield a wasteful drain of limited power resources 123 of UE 310B. To avoid this result in some circumstances, UE 310B can be notified by gNB 350 through a SIB1 message that a SSB power boost has been enabled. In this example, both UEs 310A-B receive this message during an initial synchronization with gNB 350 (e.g., by attachment or handover), and UE 310A beneficially continues the attachment process while UE 310B beneficially does not continue the attachment process.

As noted above, boosting can be enabled by gNB 350 based on different circumstances, and in another example, the boosting is enabled based on a request from one or both of UEs 310A-B, e.g., to improve reception of initial downlink signal 153.

FIG. 4 depicts an example 400 SIB1 message 450 that includes an additional field with transmission power information, in accordance with one or more embodiments. For purposes of brevity, description of like elements and/or processes employed in other embodiments is omitted.

As noted above, by boosting an SSB base station equipment 155 can facilitate UEs receiving the SIB1 450 at a greater distance and thus improve the coverage at a cell boundary, e.g., depicted as the boundary between areas 320A-B in FIG. 3. This boosting of the SSB can yield a faster NR leg setup (e.g., when a UE is working as an Evolved-Universal Terrestrial Radio Access-New Radio (EN-DC) node) because a UE can detect and read an SSB faster and in a more reliable manner. In an example implementation, an SSB (or other similar message) can be boosted with 5 dB (at 100 MHz) and 2 dB (at 50 MHz) by using power from other unused physical resource blocks (PRBs) in SSB subframes.

As depicted, in an example SIB1 450, SSB transmit power can be indicated to a UE via additional information 430 (e.g., ss-PBCH-BlockPower) appended to the other parts 420 of SIB1 450. As is appreciated by one having skill in the relevant art(s), given the disclosure herein, as depicted, ss-PBCH-BlockPower can be in ServingCellConfigCommonSIB, with ServingCellConfigCommonSIB being an object of NR-SIB1 450 used to configure cell specific parameters of a UE's serving cell.

In one or more embodiments, UE 310B can read ss-PBCH-BlockPower on SIB1 450 to determine if SSB power boosting is enabled in the target cell (e.g., gNB 350) and, if so, to what extent boosted signal 396 SSB has been boosted (e.g., 2 db in an example). As noted above, one approach that can be used by likelihood estimating component 124 of UE 150 to estimate the likelihood that base station equipment 155 will receive response uplink signal 154, is to determine the distance to base station equipment 155. One approach is to lookup the geographic location based on the PCI included in SIB1 450, and another approach is to include the latitude/ longitude of the broadcasting gNB 350 in SIB1 450.

Figure 5:
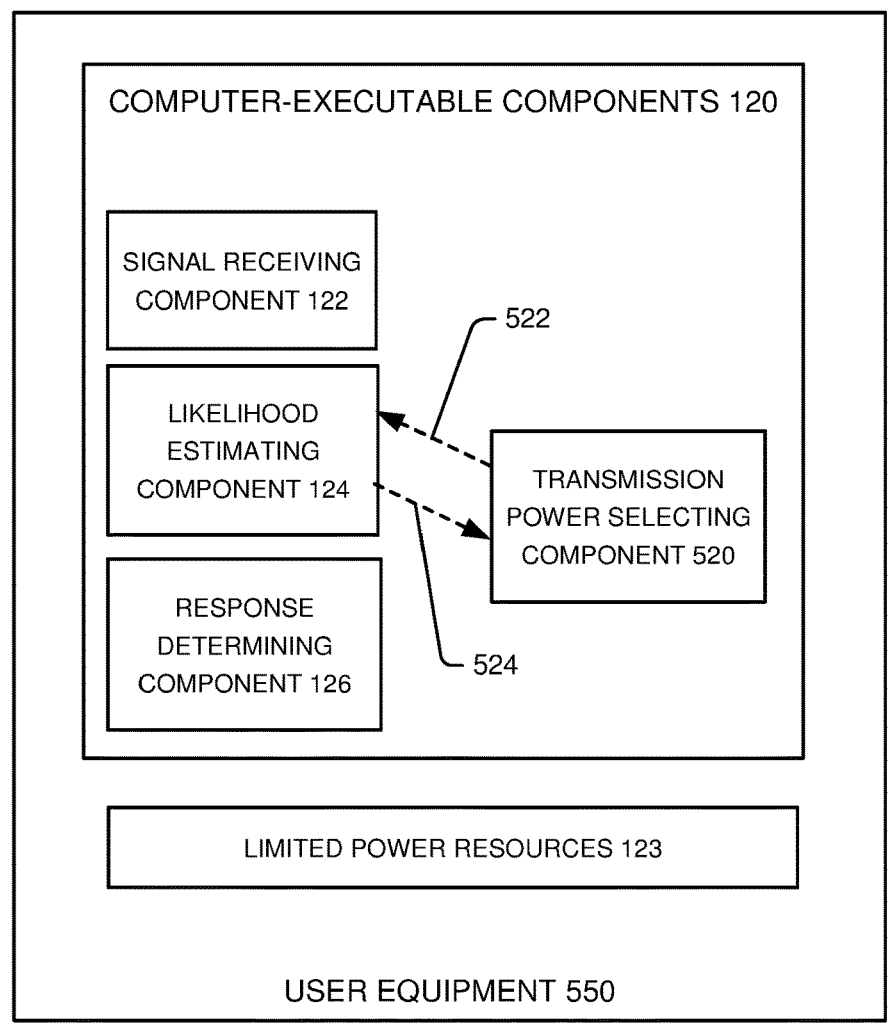
FIG. 5 is a diagram of a non-limiting example system that includes user equipment that can facilitate determining a response by a user equipment to a signal from a base station based on transmission signal strength relayed with the signal, in accordance with one or more embodiments.

FIG. 5 is a diagram of a non-limiting example system 500 that includes user equipment 550 that can facilitate determining a response by a user equipment to a signal from a base station based on transmission signal strength relayed with the signal, in accordance with one or more embodiments. For purposes of brevity, description of like elements and/or processes employed in other embodiments is omitted. As depicted, system 500 depicts user equipment 550 with limited power resources 123 and computer-executable components 120, including signal receiving component 122, likelihood estimating component 124, response determining component 126, and transmission power selecting component 520.

As noted above, response determining component 126 can determine a response to SIB1 450 based on different criteria including the transmission strength of the initial signal and the location of the transmitting base station equipment. FIG. 5 depicts system 500 where additional criteria can be provided to likelihood estimating component from transmission power selecting component 520.

In this example, based on different approaches used by UE 550 to determine transmission power, an amount of power that can be dedicated to response uplink signal 154 (e.g., also termed allocated TX.power 522) can be provided to likelihood estimating component 124 for use in determining the likely propagation of response uplink signal 154 towards base station equipment 155. In one approach to determining the likelihood, the determined distance to base station equipment 155 can be used to estimate the TX.power needed to close the distance (also termed the UL.NR.Link distance), with this estimated TX.power compared to allocated TX.power 522 to determine whether the likelihood of successful propagation is sufficient for a response by UE 550.

In an alternative approach also illustrated by FIG. 5, likelihood estimating component 124 can provide estimated TX.power 524 to transmission power selector 520, with this component determining whether sufficient TX.power can be allocated to the transmission of a response. In either approach, if a determination is made that allocated TX.power 522 is likely insufficient to reach base station equipment 155, signals from this base station can be designated as not to be evaluated for a period of time or until user equipment 550 has moved, e.g., to avoid wasting resources by repeatedly performing the TX.power analysis described above.

Figure 6:
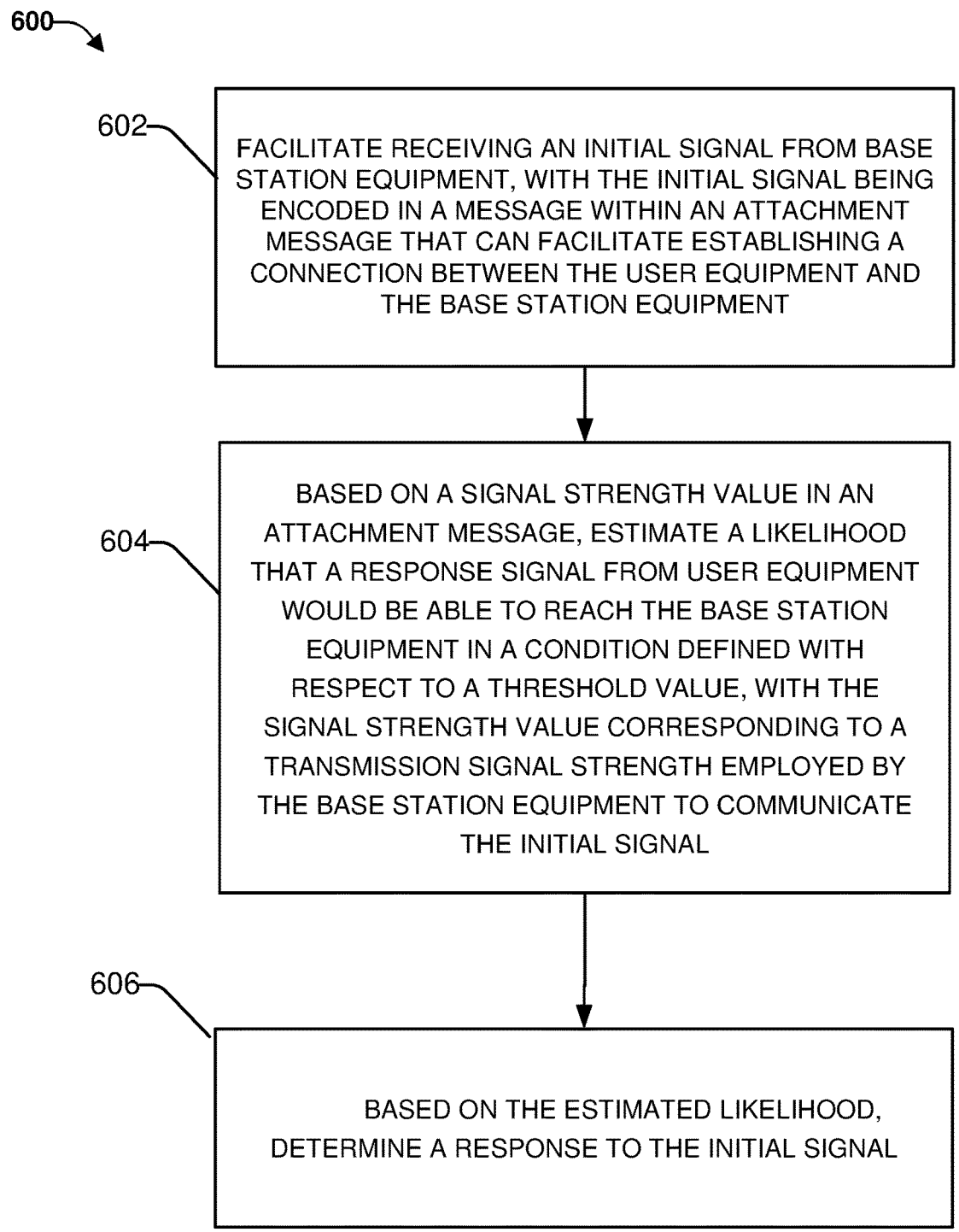
FIG. 6 illustrates an example method that can facilitate determining a response by user equipment to a signal from a base station based on transmission signal strength relayed with the signal, in accordance with one or more embodiments.

FIG. 6 illustrates an example method 600 that can facilitate determining a response by a user equipment to a signal from a base station based on transmission signal strength relayed with the signal, in accordance with one or more embodiments. For purposes of brevity, description of like elements and/or processes employed in other embodiments is omitted.

At 602, method 600 can include receiving initial downlink signal 153 from base station equipment 155, with initial downlink signal 153 encoding a message with an attachment message 152 that can facilitate establishing a connection between user equipment 150 and base station equipment 155. For example, in one or more embodiments, a method can receive initial downlink signal 153 from base station equipment 155, with initial downlink signal 153 being synchronization signal 192 with a transmission signal strength value that can facilitate establishing a connection between user equipment 150 and base station equipment 155.

At 604, method 600 can include, based on a signal strength value in attachment message 152, estimating a likelihood that a response signal from the user equipment would be able to reach base station equipment in a condition defined with respect to a threshold value, with the signal strength value corresponding to a transmission signal strength employed by base station equipment to communicate initial signal. For example, in one or more embodiments of a method can include, based on a signal strength value in synchronization signal 192, estimating a likelihood that response uplink signal 154 from user equipment 150 would be able to reach base station equipment 155 in a condition defined with respect to a threshold value, with the signal strength value corresponding to a transmission signal strength employed by base station equipment 155 to communicate initial downlink signal 153.

At 606, method 600 can include, based on the estimated likelihood, determining a response to initial downlink signal 153 by user equipment 150. For example, in one or more embodiments, based on the estimated likelihood, a response can be determined for a response to initial downlink signal 153.

Figure 7:
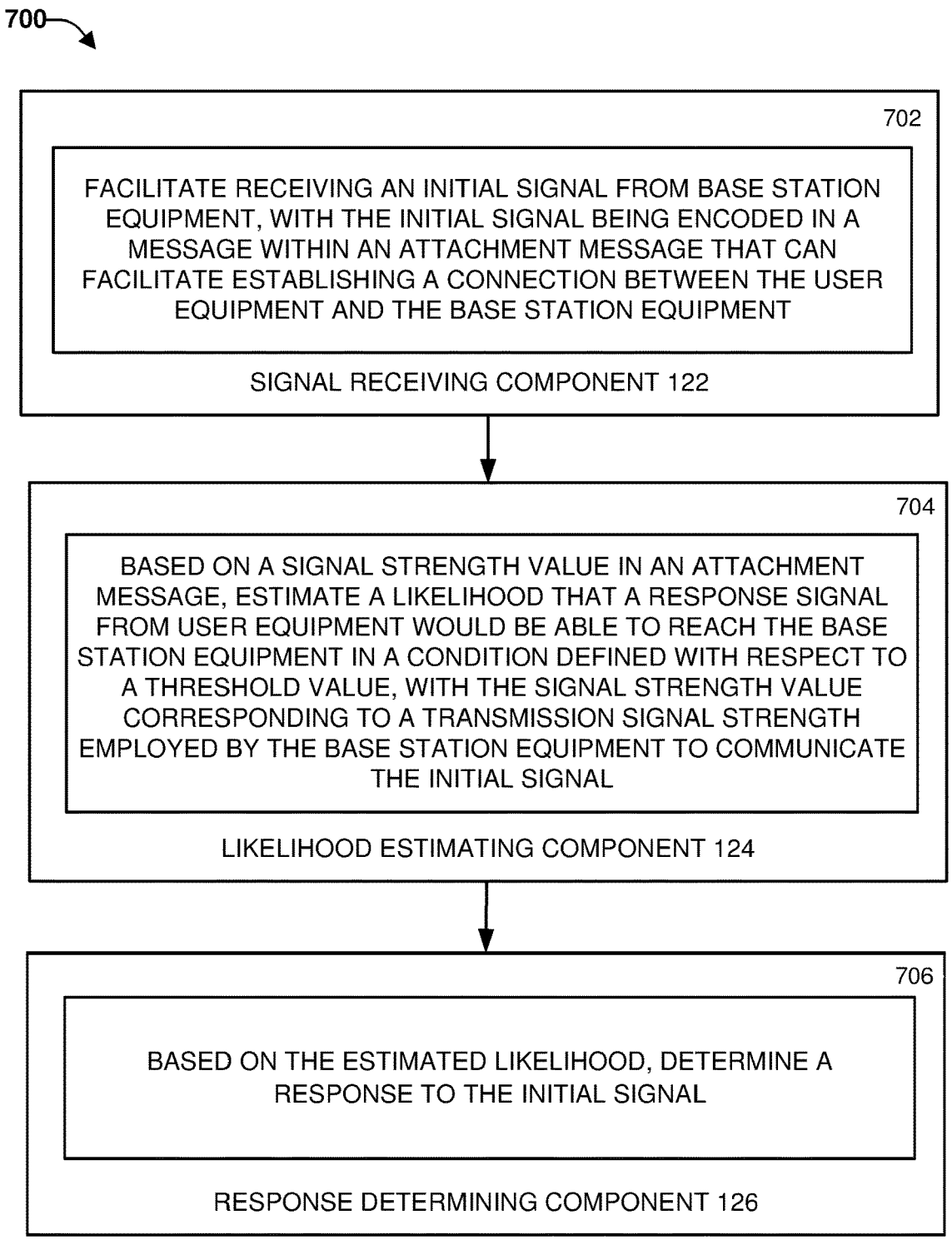
FIG. 7 depicts a system that can facilitate determining a response by user equipment to a signal from a base station based on transmission signal strength relayed with the signal, in accordance with one or more embodiments.

FIG. 7 depicts a system 700 that can facilitate determining a response by a user equipment to a signal from a base station based on transmission signal strength relayed with the signal, in accordance with one or more embodiments. For purposes of brevity, description of like elements and/or processes employed in other embodiments is omitted. As depicted, system 700 can include signal receiving component 122, likelihood estimating component 124, response determining component 126, and other components described or suggested by different embodiments described herein, that can improve the operation of system 700.

In an example, component 702 can include the functions of signal receiving component 122, supported by the other layers of system 700. For example, component 702 can facilitate receiving an initial signal from base station equipment, with the initial signal being encoded in a message within an attachment message that can facilitate establishing a connection between the user equipment and the base station equipment. For example, one or more embodiments can facilitate receiving initial downlink signal 153 from base station equipment 155, with initial downlink signal 153 encoding a message with an attachment message 152 that can facilitate establishing a connection between user equipment 150 and base station equipment 155.

In this and other examples, component 704 can include the functions of likelihood estimating component 124, supported by the other layers of system 700. Continuing this example, in one or more embodiments, component 704 can, based on a signal strength value in attachment message 152, estimate a likelihood that response uplink signal 154 from user equipment 150 would be able to reach base station equipment 155 in a condition defined with respect to a threshold value, with the signal strength value corresponding to a transmission signal strength employed by base station equipment 155 to communicate initial downlink signal 153. For example, in one or more embodiments, based on a signal strength value in attachment message 152, a likelihood can be estimated that response uplink signal 154 from user equipment 150 would be able to reach base station equipment 155 in a condition defined with respect to a threshold value, with the signal strength value corresponding to a transmission signal strength employed by base station equipment 155 to communicate initial downlink signal 153.

In an example, component 706 can include the functions of response determining component 126, supported by the other layers of system 700. For example, component 706 can, based on the estimated likelihood, determine a response to initial downlink signal 153. For example, in one or more embodiments, response determining component 126 of user equipment 150 can, based on the estimated likelihood, determine a response to initial downlink signal 153.

Figure 8:
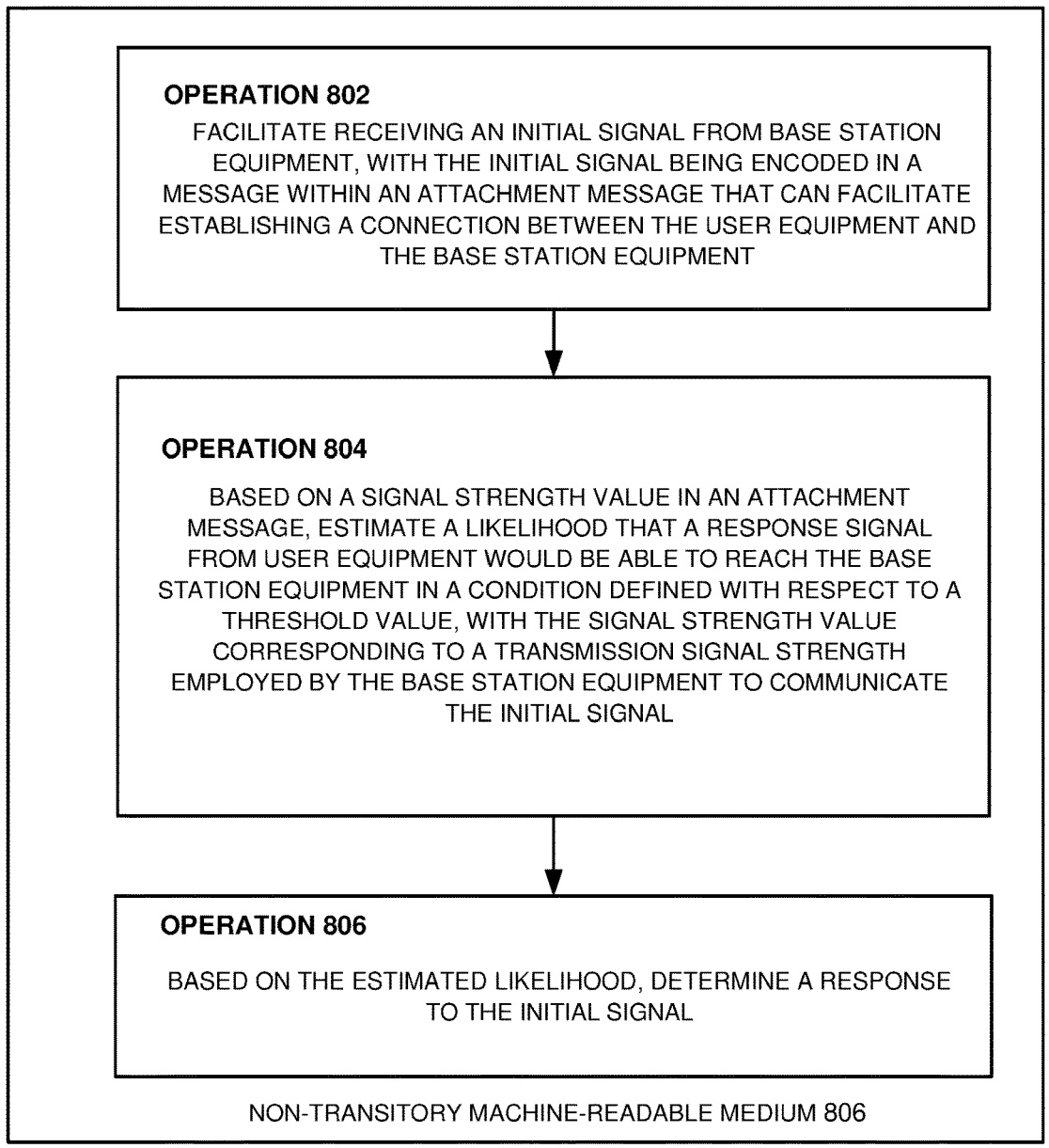
FIG. 8 depicts an example non-transitory machine-readable medium that can include executable instructions that, when executed by a processor of a system, facilitate determining a response by a user equipment to a signal from a base station based on transmission signal strength relayed with the signal, in accordance with one or more embodiments described herein.

FIG. 8 depicts an example 800 non-transitory machine-readable medium 810 that can include executable instructions that, when executed by a processor of a system, facilitate determining a response by a user equipment to a signal from a base station based on transmission signal strength relayed with the signal, in accordance with one or more embodiments described above. For purposes of brevity, description of like elements and/or processes employed in other embodiments is omitted. As depicted, non-transitory machine-readable medium 810 includes executable instructions that can facilitate performance of operations 802-808.

In one or more embodiments, the operations can include operation 802 that can facilitate receiving an initial signal from base station equipment, with the initial signal being encoded in a message within an attachment message that can facilitate establishing a connection between the user equipment and the base station equipment. For example, in one or more embodiments operation 802 can facilitate receiving initial downlink signal 153 from base station equipment 155, with initial downlink signal 153 encoding a message with an attachment message 152 that can facilitate establishing a connection between user equipment 150 and base station equipment 155.

Operations can further include operation 804, that can, based on a signal strength value in attachment message 152, estimate a likelihood that response uplink signal 154 from user equipment 150 would be able to reach base station equipment 155 in a condition defined with respect to a threshold value, with the signal strength value corresponding to a transmission signal strength employed by base station equipment 155 to communicate initial downlink signal 153. For example, in one or more embodiments operation 804 can, based on a signal strength value in attachment message 152, estimate a likelihood that response uplink signal 154 from user equipment 150 would be able to reach base station equipment 155 in a condition defined with respect to a threshold value, with the signal strength value corresponding to a transmission signal strength employed by base station equipment 155 to communicate initial downlink signal 153.

In one or more embodiments, the operations can include operation 806 that can, in one or more embodiments, based on the estimated likelihood, determine a response to initial downlink signal 153. For example, in one or more embodiments operation 806 can, based on the estimated likelihood, determine a response to initial downlink signal 153.

Figure 9:
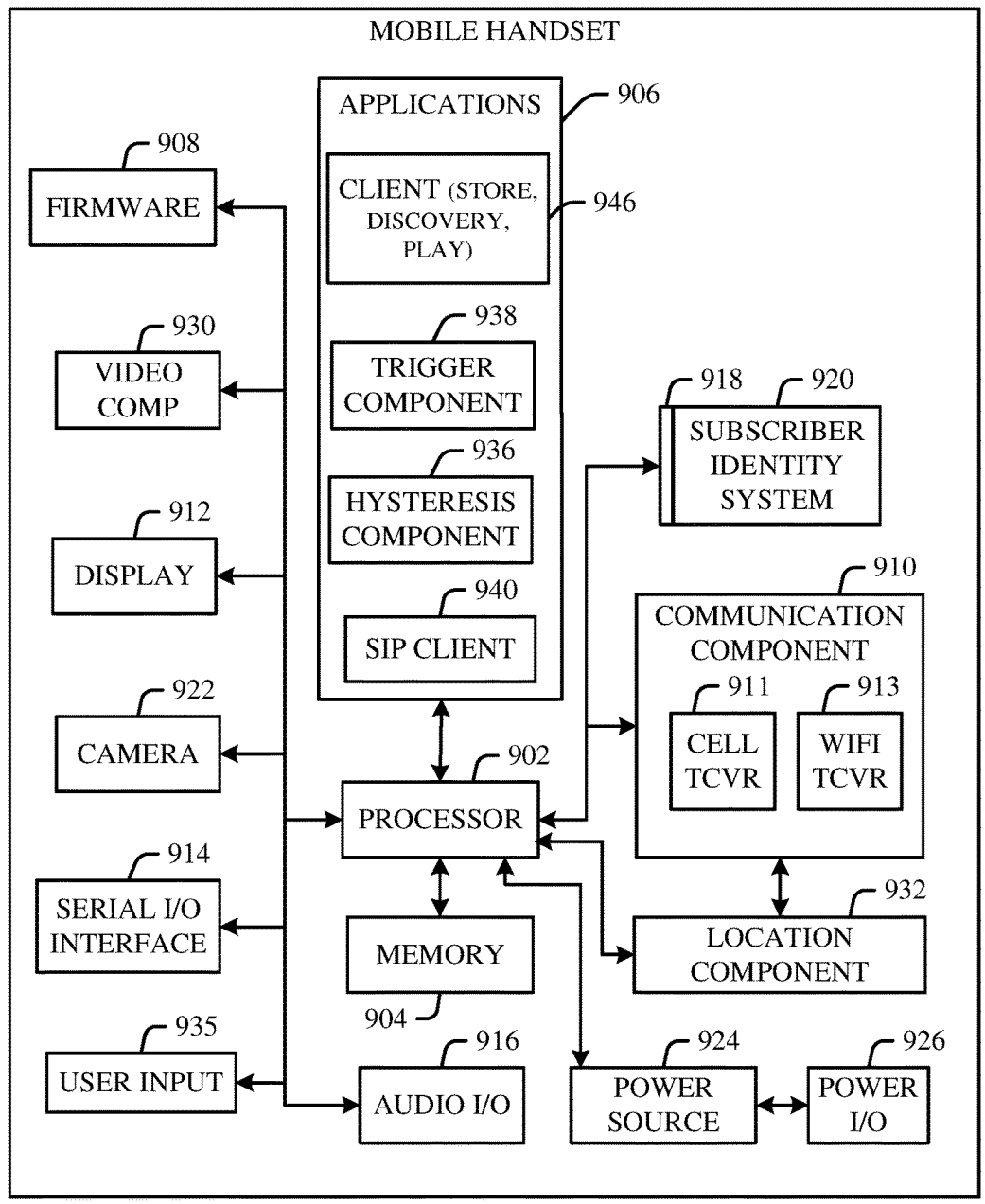
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
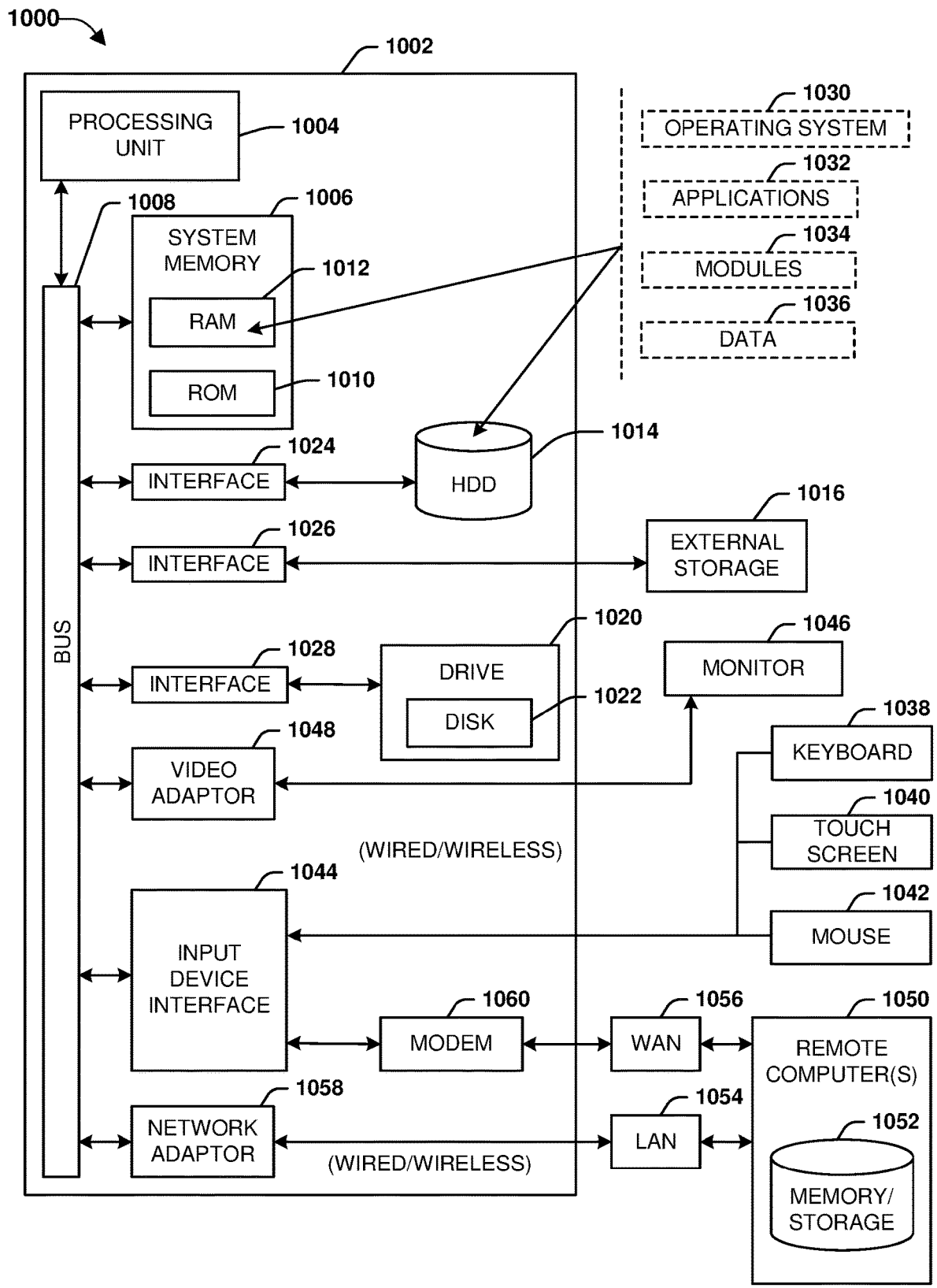
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
    facilitating, by a user equipment comprising a processor, receiving a first signal from base station equipment, wherein the first signal encodes a message that comprises an attachment message that facilitates establishing a connection between the user equipment and the base station equipment;
    based on a signal strength value comprised in the attachment message, estimating, by the user equipment, a likelihood that a second signal, from the user equipment, is able to reach the base station equipment in a condition defined with respect to a threshold value, resulting in an estimated likelihood, wherein the signal strength value corresponds to a transmission signal strength employed by the base station equipment to communicate the first signal; and
    based on the estimated likelihood, determining, estimating, by the user equipment, a response to the first signal.

2. The method of claim 1, wherein the threshold value comprises a level of performance of an uplink transmission of the second signal to the base station equipment from the user equipment.

3. The method of claim 1, further comprising, determining, by the user equipment, a transmission distance between the user equipment and the base station equipment, wherein the estimated likelihood is further based on the transmission distance.

4. The method of claim 3, wherein the attachment message comprises a broadcast system information message, wherein the transmission distance is based on a geographic location of the base station equipment, and wherein the geographic location of the base station equipment was determined by the user equipment based on base station information comprised in the broadcast system information message.

5. The method of claim 4, wherein the first signal is received during an attachment procedure to attach the user equipment to the base station equipment, and wherein estimating the likelihood is performed by the user equipment based on the base station information comprised in the broadcast system information message.

6. The method of claim 4, wherein the base station information comprises a cell identifier corresponding to the base station equipment, and wherein the method further comprises determining, by the user equipment, the geographic location of the base station equipment based on the cell identifier.

7. The method of claim 1, wherein the attachment message comprises an indication that the signal strength value corresponds to the transmission signal strength boosted above a strength threshold value.

8. The method of claim 7, wherein the transmission signal strength was boosted by the base station equipment to extend a coverage range of the first signal for the first signal to be received by the user equipment.

9. The method of claim 1, wherein the estimated likelihood is further based on an allocated transmission power for communication of the second signal to the base station equipment, and power available to the user equipment for transmission of the second signal.

10. The method of claim 1, further comprising, in response to the estimated likelihood being determined to be above or equal to a selected likelihood, controlling, by the user equipment, the response to be communicating the second signal to the base station equipment to facilitate establishing the connection, and wherein the method further comprises, based on the estimated likelihood, selecting, by the user equipment, a transmission power to allocate for communication of the second signal.

11. The method of claim 1, further comprising, in response to the estimated likelihood being determined to be below a defined likelihood, controlling, by the user equipment, the response to the first signal to be not responding to the first signal.

12. The method of claim 11, wherein the defined likelihood was selected to reduce power consumption by the user equipment below a power consumption threshold.

13. A first network device, comprising:
a processor; and
a memory that stores executable instructions that, when executed by the processor, facilitate performance of operations, comprising:
broadcasting, at a selected signal strength, a connection reference signal to a geographic area, wherein the connection reference signal comprises signal information corresponding to the selected signal strength and an identifier of the first network device; and
receiving a connection response signal from a second network device within the geographic area, wherein, based on the signal information received with the connection reference signal, the second network device determined a likelihood that the connection response signal would reach the first network device in a condition, and wherein whether the condition of the connection response signal is present is determined in relation to a threshold level of signal quality.

14. The first network device of claim 13, wherein the selected signal strength was selected based on available transmission resources of the second network device.

15. The first network device of claim 13, wherein the selected signal strength comprises a boosted signal strength that was boosted based on information that the second network device requested the boosted signal strength to receive the connection reference signal.

16. The first network device of claim 13, wherein the threshold level of signal quality was selected to reduce power consumption by the second network device below a power consumption threshold level.

17. A non-transitory machine-readable medium, comprising executable instructions that, when executed by a processor of network node equipment, facilitate performance of operations, comprising:
receiving a downlink signal comprising synchronization information for signal source equipment;
based on a signal strength transmission value encoded within the downlink signal, estimating a likelihood that a handover request signal is able to reach the signal source equipment in response to the downlink signal, resulting in an uplink likelihood; and
based on the uplink likelihood, determining a response to the downlink signal.

18. The non-transitory machine-readable medium of claim 17, wherein the signal strength transmission value corresponds to a transmission signal strength employed by the signal source equipment to transmit the downlink signal.

19. The non-transitory machine-readable medium of claim 18, wherein the transmission signal strength comprises a boosted signal strength that was boosted based on information that the network node equipment requested the boosted signal strength to receive the downlink signal.

20. The non-transitory machine-readable medium of claim 17, wherein the downlink signal comprises a system information broadcast message.

* * * * *